United States Patent [19]

Franaszek et al.

[11] Patent Number: 5,001,730
[45] Date of Patent: Mar. 19, 1991

[54] CLOCK SYNCHRONIZATION ALGORITHM FOR ADDRESS INDEPENDENT NETWORKS

[75] Inventors: Peter A. Franaszek, Katonah; Thomas K. Philips, Hopewell Junction, both of N.Y.

[73] Assignee: International Business Machines Corporation, Armonk, N.Y.

[21] Appl. No.: 331,552

[22] Filed: Mar. 31, 1989

[51] Int. Cl.$^5$ ............................. H04L 7/00; H04J 3/00
[52] U.S. Cl. .................................. 375/107; 370/85.4; 370/103; 370/105; 340/825.14
[58] Field of Search ................. 375/107; 370/103, 105, 370/108, 85.4, 85.5, 100.1, 108; 340/825.14

[56] References Cited

U.S. PATENT DOCUMENTS 4,746,920  5/1988  Nellen ................................. 375/107

OTHER PUBLICATIONS

Cristian et al., "Clock Synchronization in the Presence etc." *Proc. 16th Intnl. Symp. Fault Tolerant Comp.*, Vienna, Jun. 1986.
Franaszek, "Address-Independent Routing for Local Networks" *IBM J. Res. Develop.*, Sep. 1983, pp. 464–471.
Dolev et al., "Fault-Tolerant Clock Synchronization", *Proc. of 3rd Annual ACM Symp. Princ. Dist. Comp.*, 1984, pp. 89–102.
Lamport et al., "Synchronizing Clocks in the Presence of Faults", *Journal of the ACM*, vol. 32, No. 1, Jan. 1985, pp. 52–78.
Lundelius et al., "A New Fault-Tolerant Algorith for Clock Synch.", *Proc. 3rd ACM Symp. Princ. of Dist. Comp.*, 1983.

Primary Examiner—Douglas W. Olms
Assistant Examiner—Christopher Edwards
Attorney, Agent, or Firm—Whitham & Marhoefer

[57] ABSTRACT

A distributed algorithm for clock synchronization in address independent networks such as token rings and token busses is described. Synchronization is accomplished by using the fastest clock in the network as the master clock against which all other clocks in the network are synchronized. An algorithm is implemented in which each node sends out a message to all the other nodes in the network when its timer times out to tell its time. If a node receives a message with a higher clock time before it has had an opportunity to send out its own message, that node assumes that it is not the fastest node and it will not send out its message. Provision is made for maximum and minimum delays that are expected within a particular network. It has been proven that after a few cycles, all nodes will be synchronized to the node with the fastest clock and that this node will be the only one to transmit its time.

8 Claims, 5 Drawing Sheets

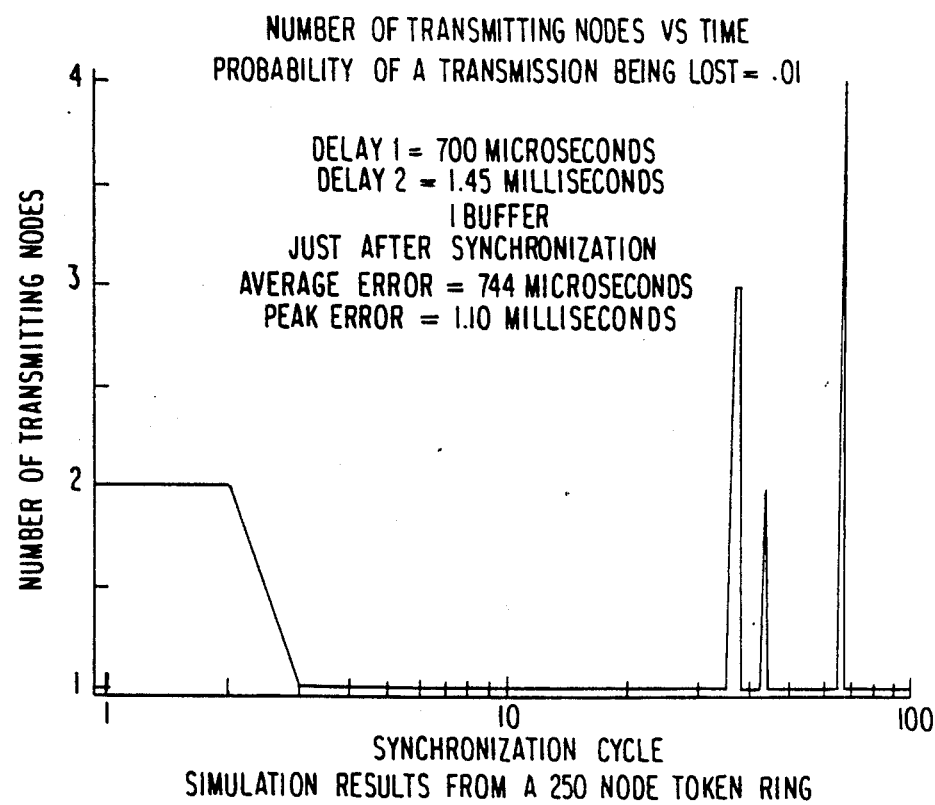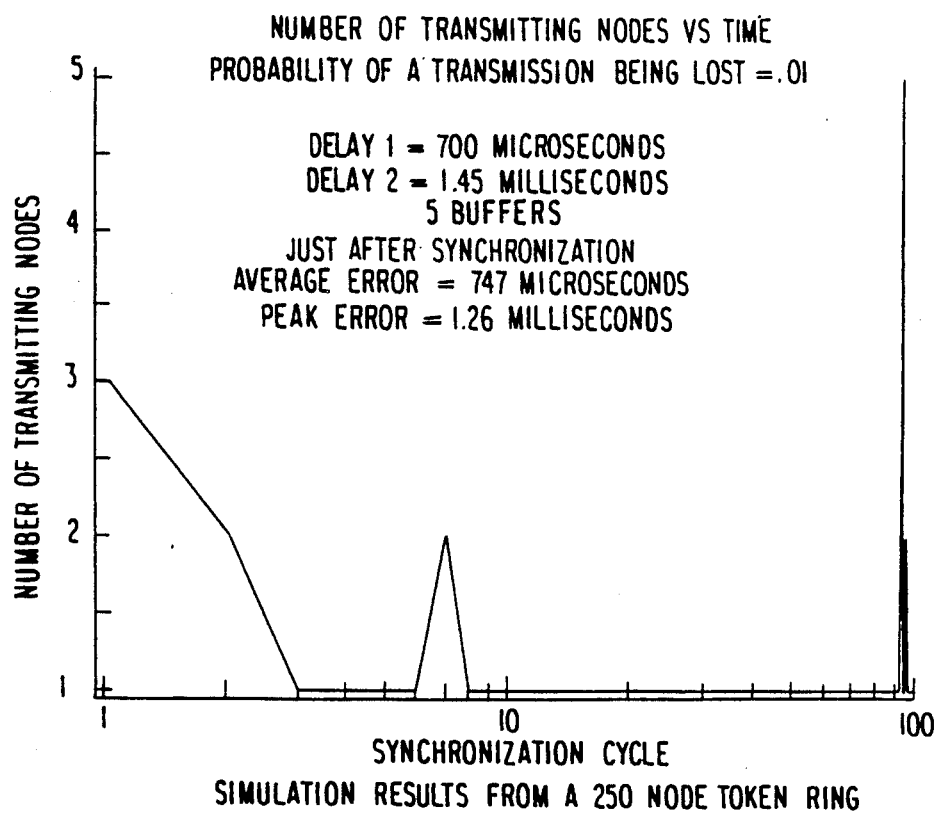

CLOCK SYNCHRONIZATION ALGORITHM FOR ADDRESS INDEPENDENT NETWORKS

BACKGROUND OF THE INVENTION

1. Field of the Invention

The present invention generally relates to an algorithm for the synchronization of clocks in address independent networks including, but not limited to, token rings and token busses and, more particularly, to an algorithm which takes advantage of characteristics of the network by using the fastest clock in the network as the master.

2. Description of the Prior Art

In a distributed computer system, if shared resources are accessed, a log of the sequence of accesses must be maintained so that in the event of a failure, transactions can be restarted in the correct order. As transactions are ordered in a log via a time stamp, all the clocks in the system must be synchronized closely enough so as to ensure the consistency of the log. Such clocks are sometimes referred to as "real-time" clocks.

A number of algorithms that place no restriction on the topology of the network or the kind of routing employed have been proposed. See, for example, Cristian, F., H. Aghili and R. Strong, "Clock Synchronization in the Presence of Omission and Performance Faults and Processor Joins", *Proc. of the 16th Intnl. Symposium on Fault Tolerant Computing,* Vienna, June 1986, Dolev, D., J. Halpern, B. Simons and R. Strong, "Fault Tolerant Clock Synchronization", *Proceedings of the 3rd Annual ACM Symposium on Principles of Distributed Computing,* 1984, pp. 89–102, Lamport, L., and M. Melliar-Smith, "Synchronizing Clocks in the Presence of Faults", *Journal of the ACM,* vol. 32, No. 1, Jan. 1985, pp. 52–78, and Lundelius, J., and N. Lynch, "A New Fault Tolerant Algorithm for Clock Synchronization", *Proc. 3rd ACM Symposium on the Principles of Distributed Computing,* 1983.

Messages containing local clock times are passed between processors until all the clocks in the network are synchronized to within some quantity $\Delta$. To prevent messages persisting indefinitely in the network, each time a clock synchronization message is received at a node, it is processed and a decision is made as to whether or not an outgoing message is to be generated. Notice that this requires the clock synchronization message to be brought up into and processed by the system software. As software delays are typically an order of magnitude greater than link delays, this limits the accuracy with which the clocks can be synchronized. In addition, the algorithms employed tend to be complex.

SUMMARY OF THE INVENTION

It is therefore an object of the invention to provide a simple clock synchronization algorithm for synchronization of clocks in a distributed network.

It is a further object of the invention to provide a clock synchronization algorithm for broadcast networks that takes advantage of the characteristics of such networks.

It is another object of the invention to provide a simple yet accurate clock synchronization algorithm which may be implemented in software of hardware.

The objects of the invention are accomplished by using the fastest clock in the network as the master clock against which all other clocks in the network are synchronized. Broadly described, the invention implements an algorithm in which each node sends out a message to all the other nodes in the network periodically to tell its time. If a node receives a message with a higher time than its own before it has had an opportunity to send out its own message, that node assumes that it is not the fastest node and it will not send out its message. Provision is made for maximum and minimum delays that are expected within a particular network. Simulation studies show that after a few cycles, all nodes will be synchronized and that only the fastest clock in the network will transmit its time.

What sets the implemented algorithm apart from others is its simplicity, its ability to synchronize clocks near optimally, and its optimal message complexity; i.e., its ability to synchronize clocks using only one message per synchronization cycle. As at least one message must be sent per synchronization cycle, this is clearly optimal.

BRIEF DESCRIPTION OF THE DRAWINGS

The foregoing and other objects, aspects and advantages of the invention will be better understood from the following detailed description of preferred embodiments of the invention with reference to the drawings, in which:

FIG. 6 is a graph showing the results of a simulation of a 250 node token ring with one buffer and 0.1 probability of a transmission being lost using the implementation of the algorithm; and FIG. 7 is a graph showing the results of a simulation of a 250 node token ring with five buffers and 0.1 probability of a transmission being lost using the implementation of the algorithm.

DETAILED DESCRIPTION OF THE PREFERRED EMBODIMENTS OF THE INVENTION

Figure 1:
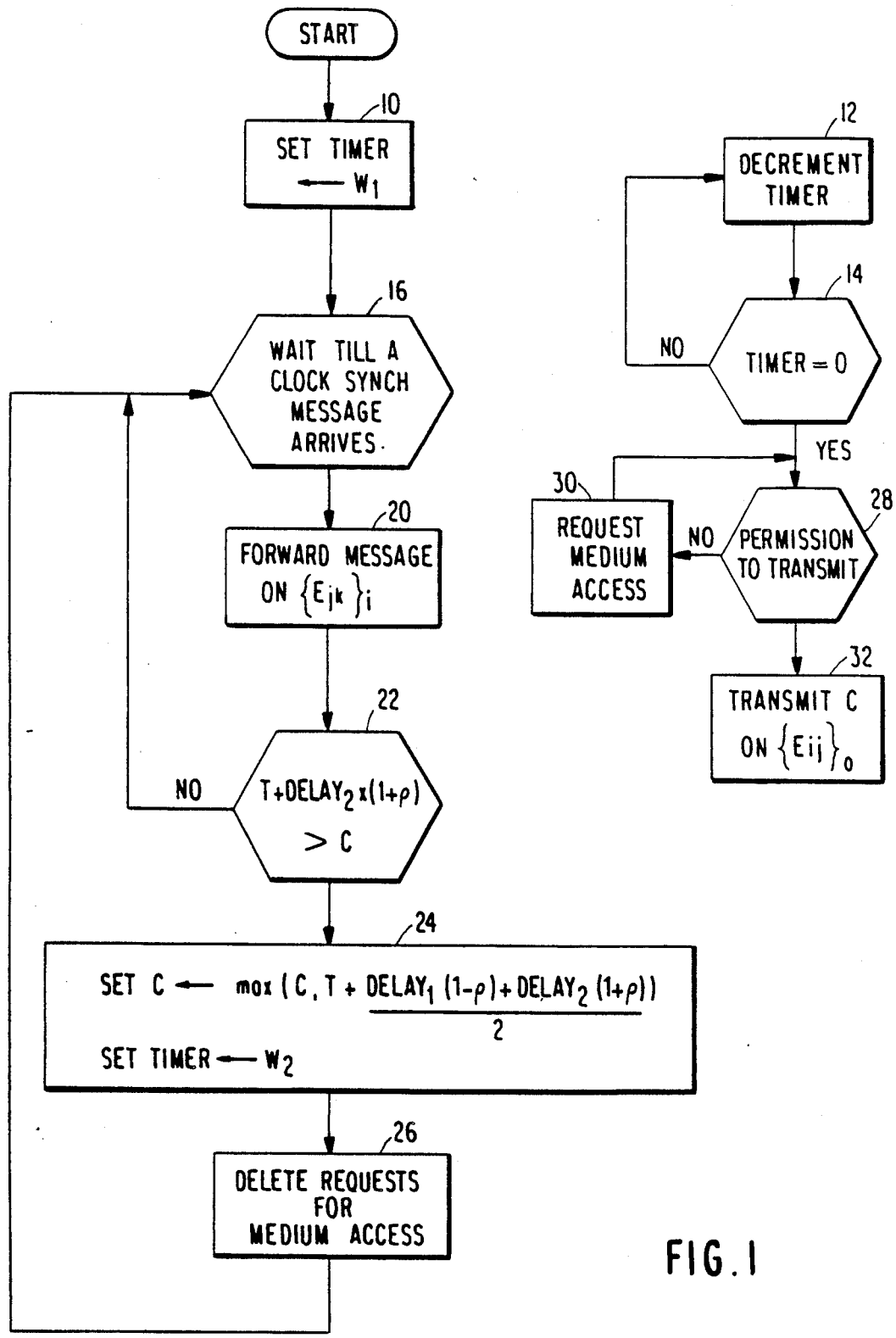
FIG. 1 is a flow diagram showing the logic of the process implementing the algorithm according to the invention in software.

By restricting the invention to a class of networks known as address independent networks, simple algorithms for clock synchronization which do not require messages to be examined before being forwarded can be formulated. An address independent network is defined by Franaszek, P. A., in "Address Independent Routing for Local Networks", *IBM J. Res. Develop.,* Sept. 1983, pp. 464–471, as a network in which messages are routed under the following constraints:

(a) A message originating at a node $V_i$ is transmitted along a set of edges $\{E_{ij}\}_o$.

(b) A message entering a node $V_j$ on edge $E_{ij}$ is forwarded on along a set of edges $\{E_{jk}\}_i$. If the set of edges $\{E_{jk}\}_i$ is empty, then $V_j$ will be termed a stop node for edge $E_{ij}$.

(c) There is no forwarding along the original edges $\{E_{ij}\}_o$.

(d) Propagation of all messages stops after they traverse a finite number of links.

(e) A message originating at any node must reach all of the other nodes in the network.

In the foregoing definition, "edges" are simply the links or wires or fiber optic lines that interconnect the nodes in a network. In the terminology of Graph theory, an edge is a line that connects two nodes.

Note that the forwarding depends solely on the edge on which the message was received. The routing mechanism can therefore be hard wired, making it extremely fast. A number of address independent networks are in current use. They include the token ring, the token bus, Ethernet ®, fibernet and Starlan ®.

A broad range of assumptions may be made about the environment in which the network, and consequently the clock synchronization algorithm, is to operate. In practice, the vast majority of networks operate in a non-hostile environment. Failures tend to be rare, and the use of error control coding has all but eliminated noise induced transmission errors. Significant simplifications can therefore result if the algorithms are designed to work correctly in a perfect environment, and a few lines of code added to it so as to deal with the occasional problems that might arise. This point of view is diametrically opposite to that taken by many authors, e.g., L. Lamport et al. cited above, and results in a very simple algorithm for clock synchronization. If one assumes a hostile environment, a substantial fraction of the algorithm has to be devoted to dealing with faults, this being especially true of algorithms that allow the presence of malicious or Byzantine faults.

The following assumptions are made about the clocks in the network:

(1) All clocks run at a rate that is bounded between $(1-\rho)$ and $(1+\rho)$ with respect to absolute time.

(2) The drift rate of the clock is fixed.

(3) Clocks may be only set forward.

(4) The drift rate of a clock may not be adjusted.

(5) A synchronization message sent from one processor to another over a non-faulty link arrives and is processed in at least delay$_1$ and at most delay$_2$ seconds from the time the processor that sent the message read its clock.

(6) A message is never lost.

(7) A request by a node for access to the network must be granted within access delay seconds.

As clocks are often used to measure the time taken to perform tasks, it is desirable that they never be set back. This disallows the possibility of a task taking a negative amount of time to complete as could happen if the clock were set back while the task was in progress. We must, therefore, synchronize all clocks to the clock with the highest time, which after a sufficiently long period of time will be the clock with the highest drift rate.

The following key observation underlies the algorithm implemented by the invention. If a node receives a clock synchronization message containing a time greater than its own, it cannot have the highest clock time in the network.

A further refinement that has been incorporated is the inclusion of a corrective term to account for the variation in delay that may be experienced by a message. Instead of checking to see if an incoming message contains a clock time that is higher than its own, a node checks if the clock time in the message plus the worst case delay that it might have been encountered is greater than its local clock time. If so, the local clock is advanced to the minimax estimate of the time currently read on the clock of the node that sent the message.

The net effect is to ensure that a steady state exists in which only one node transmits. In a network with two nodes, immediately after synchronization, clocks can be synchronized to within $$(\text{delay}_2 \times (1+\rho) - \text{delay}_1 \times (1-\rho))/2$$

and, in a network with more than two nodes, clocks can be synchronized to within $$(\text{delay}_2 \times (1+\rho) - \text{delay}_1 \times (1-\rho)).$$

As shown in Lundelius, J., and N. Lynch, "An Upper and Lower Bound for Clock Synchronization", *Info. and Control*, vol. 62, 1984, pp. 190–204, in a network with N clocks, the accuracy of clock synchronization is lower bounded by $$(\text{delay}_2 - \text{delay}_1) \times \frac{N-1}{N}.$$

The algorithm according to the invention is near optimal which, in light of its simplicity and low communication complexity, is quite surprising.

It is assumed that the algorithms are run on a conflict free network, such as a token ring, where medium access is granted to one node at a time. It is only in a conflict free network that bounds on the delay can be guaranteed, and this is vital to the proof that only one node transmits in the steady state. Simulation evidence shows the algorithm to be extremely robust, however, and it may be used in networks that allow many stations to contend for the communication channel with only a slight loss of performance.

Referring now to the drawings, and more particularly to FIG. 1, there is shown the flow diagram implementing the algorithm of the invention. In block 10, a timer is reset to $W_1$. The timer then begins to count down under the control of the local clock. This is indicated by function block 12. After each decrement of the timer, a test is made in decision block 14 to determine if the counter has counted down to zero. If not, the counter continues to count down. Meanwhile, a test is made in decision block 16 to determine if a clock synchronization message has been received from another node. When a message, including the time T, is received on edge $E_{ij}$ in decision block 16, the time T is then forwarded in a message on the set of edges $\{E_{jk}\}_i$ in function block 20. A test is then made block 22 to determine if $$T + \text{delay}_2 \times (1+\rho)$$

is greater than C. If it is, C is set to $$\max(C, T + (\text{delay}_1 \times (1-\rho) + \text{delay}_2 \times (1+\rho))/2)$$

and the timer is set to $W_2$, where $W_2$ is greater than $W_1$, as indicated in function block 24. Then, in function block 26, any requests for medium access are deleted before the process returns to decision block 16 to wait for another clock synchronization message. If on the other hand the test in decision block 22 is negative, the process returns directly to decision block 16 to wait for another clock synchronization message. If, during this process, the timer times out as determined by the test in decision block 14, a test is made in decision block 28 to determine if the node has permission to transmit. If not, a request is made in function block 30 for medium access. When access is granted, a message containing C is transmitted to the set of edges $\{E_{ij}\}_o$ in function block 32.

Notice that if a node receives a synchronization message that contains a clock time T such that $T+\text{delay}_2 \times (1+\rho)$ is greater than C, the time read on its own clock, it resets its timer and is thus prevented from transmitting its clock time. Intuitively, it is clear that after a sufficiently long period of time, slow nodes will cease to transmit, as their clocks will be reset every time they receive a message from a node with a faster clock. Careful analysis shows that under the above assumptions, only the node with the highest drift rate transmits in the steady state.

Consider first the relationship of $W_1$ and $W_2$ to the parameters of the network and the clocks. In the steady state, nodes of low drift rate are prevented from transmitting by having them reset every $W_1$ seconds. When a node is updated, its timer is immediately reset to $W_2$, which is chosen so that it will not timeout and transmit before the next update is received. We therefore must have $$W_1 < (1 - \rho) \times \left[ \frac{W_2}{1 + \rho} - \text{access\_delay} - \text{delay}_2 \right]$$

In the worst case, it can take as much as $W_2/(1-\rho)$ "real" seconds for a node to time out, and a further delay of access delay + delay$_2$ seconds for every node to receive the synchronization message. In this time, two clocks can drift apart by at most $$D_{max} = \left[ \frac{W_2}{1 + \rho} - \text{access\_delay} - \text{delay}_2 \right] \times 2\rho$$

clock seconds. Immediately after synchronization, a clock differs by at most
$T_{max} = (\text{delay}_2 \times (1+\rho) - \text{delay}_1 \times (1-\rho))/2$,
from the clock with the highest time. It follows then that two clocks cannot ever differ by more than $\Delta \triangleq 2 \times T_{max} + D_{max}$, and if the various network parameters and $\rho$ are specified, we may immediately determine suitable values for $W_1$ and $W_2$.

The algorithm as presented has a minor shortcoming. If a node joins the network, it has to wait until the end of the current synchronization cycle for its clock to be set. To remedy this problem, we force a node to transmit a request for synchronization when it joins the network. The modification to the algorithm is very simple. Under the above assumptions, if $$W_1 < (1 - \rho) \times \left[ \frac{W_2}{1 + \rho} - \text{access\_delay} - \text{delay}_2 \right]$$

then the algorithm possesses a steady state in which only the node with the highest drift rate transmits.

Figure 2:
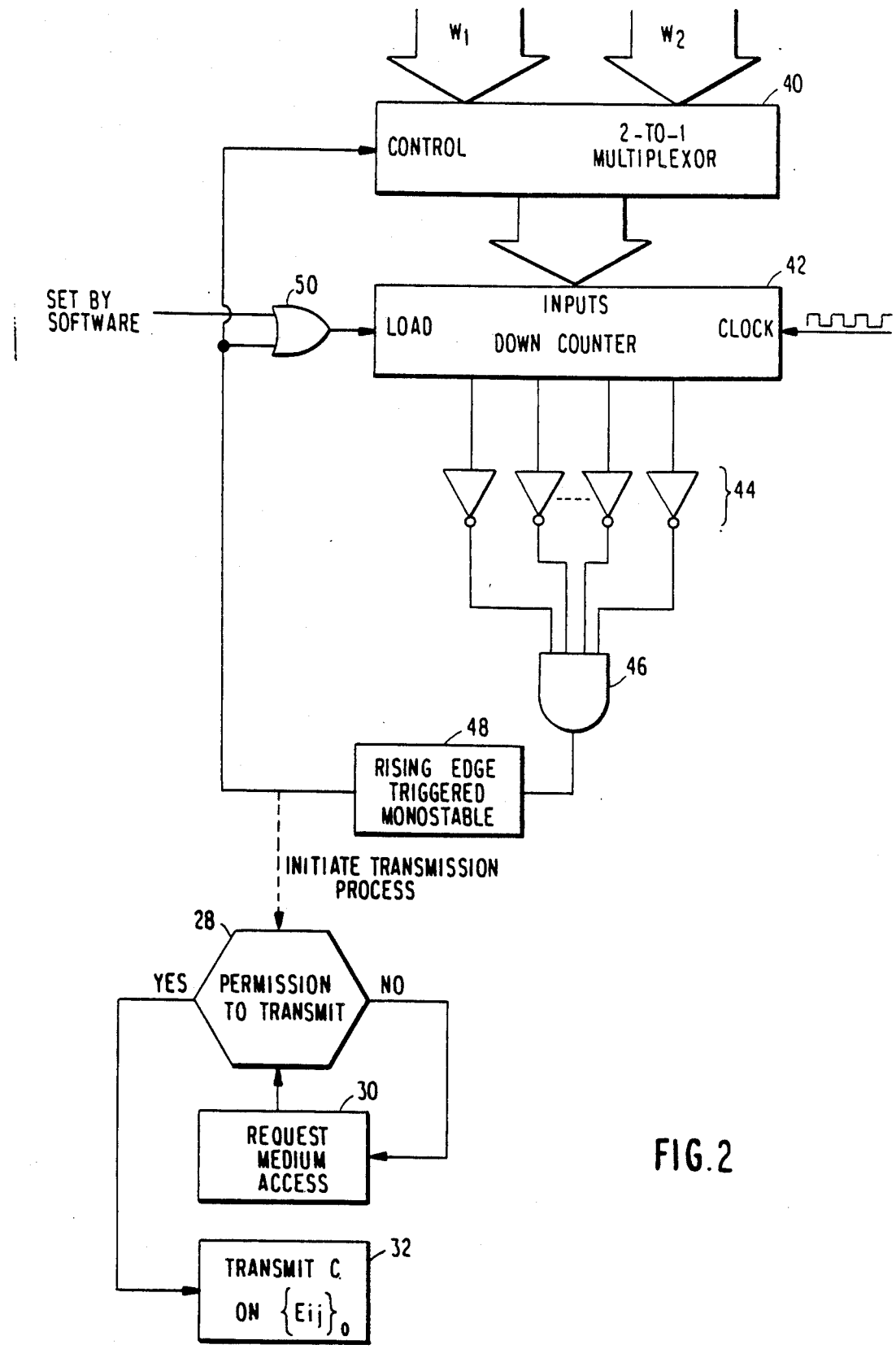
FIG. 2 is a logic diagram showing an implementation of a portion of the algorithm according to the invention in hardware.

FIG. 2 is a logic diagram showing an implementation of a portion of the algorithm in hardware. A multiplexer 40 loads either a number $W_1$ or a number $W_2$ in a down counter 42. The numbers $W_1$ and $W_2$ are typically stored in registers dedicated to that purpose. The number of bits used to represent $W_1$ and $W_2$ is left to the discretion of the designer, although $W_1$ must be less than $$(1 - \rho) \times \left[ \frac{W_2}{1 + \rho} - \text{access\_delay} - \text{delay}_2 \right].$$

The down counter 42 is driven by a local clock signal, and if the counter reaches zero, this is detected by the inverters 44 and the AND gate 46. A zero in counter 42 causes the output of AND gate 46 to rise from a logical "0" to a logical "1", triggering the monostable multivibrator 48 to produce a brief pulse. This pulse should be long enough to allow $W_1$ to be loaded into the down counter 42 via multiplexer 40. The pulse from the monostable multivibrator 48 does two things. First, it raises the control input of the multiplexer 40 to logical "1" so that $W_1$ is produced at its output. Second, it raises the load (or strobe) input of the down counter 42 to logical "1", loading $W_1$ into the counter. The counter then counts downwards again.

The output of the monostable multivibrator 48 also initiates the transmission process. This is the same process is the same process as comprised of decision block 28 and function blocks 30 and 32 in FIG. 1.

It will be observed that the operation just described implements blocks 10, 12 and 14 in the flow diagram shown in FIG. 1 for the case where $T+\text{delay}_2 \times (1+\rho) > C,$ i.e., the test in decision block 22 is negative. However, if the test in decision block 22 is positive, then the input to the OR gate 50 under the control of software is raised to a logical "1", strobing the load input of the counter 42. Since the multiplexer's control line remains at logical "0", $W_2$ is loaded into the down counter, which counts down as before.

Figure 3:
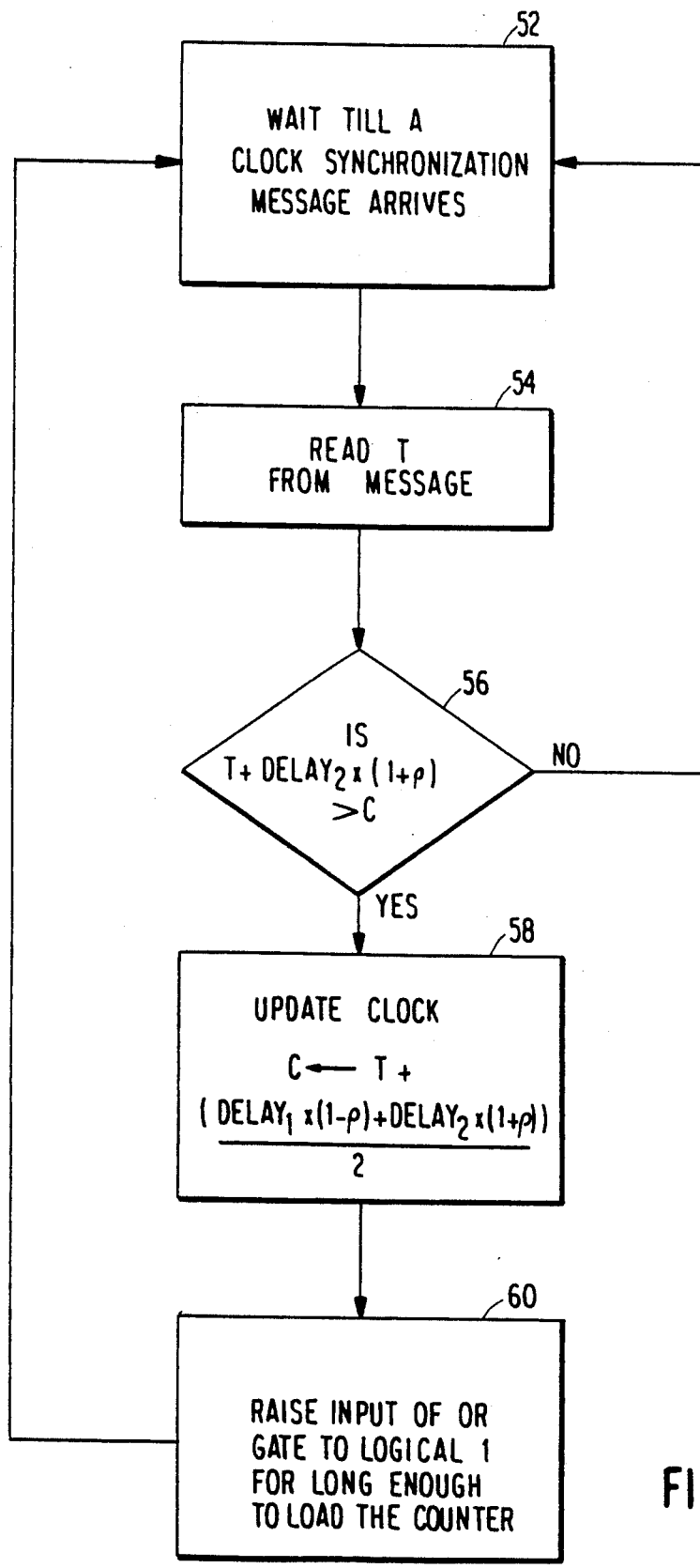
FIG. 3 is a flow diagram showing the logic of the software that supports the hardware shown in FIG. 2.

The software that generates the input to OR gate 50 is shown in FIG. 3. In block 52, the system waits for a clock synchronization message to arrive. When such a message does arrive, the time T is read from the message in function block 54 and a test is made in decision block 56 to determine if $T+\text{delay}_2 \times (1+\rho)$ is greater than C. If it is, C is set to $T+(\text{delay}_1 \times (1-\rho) + \text{delay}_2 \times (1+\rho))/2$ in function block 58, and the input to OR gate 50 is raised to logical "1" to load counter 42 in function block 60 before the process returns to block 52. Of course, if the test in decision block 54 is negative, the process returns to block 52 without the input to the OR gate being raised to a logical "1".

Figure 4:
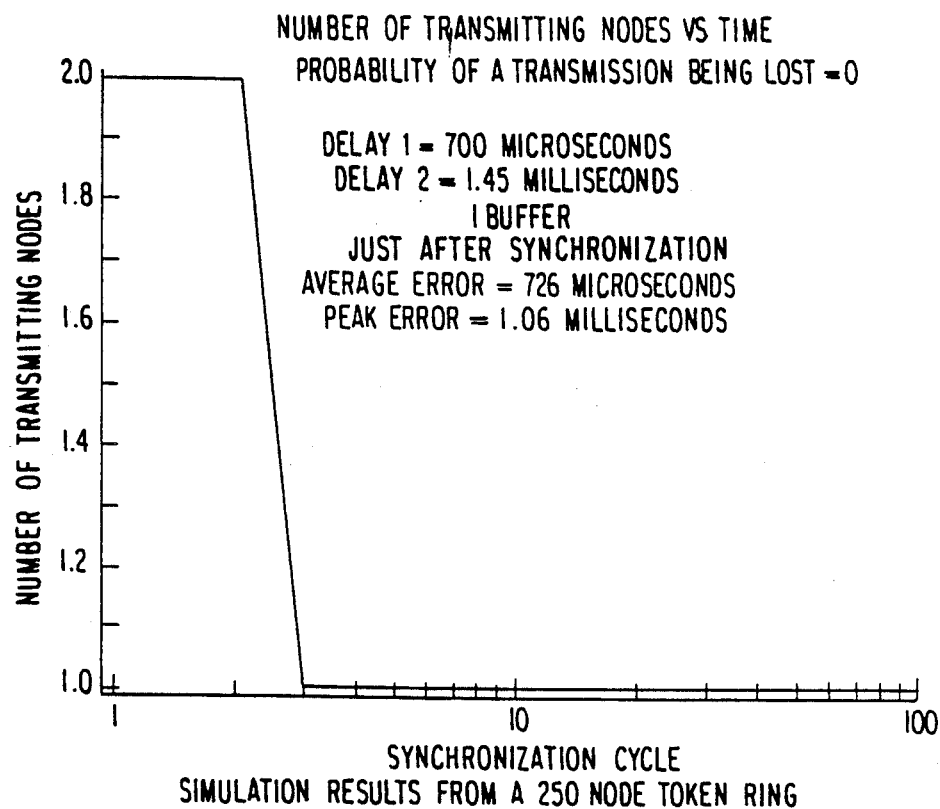
FIG. 4 is a graph showing the results of a simulation of a 250 node token ring network with one buffer and zero probability of a transmission being lost using the implementation of the algorithm.
Figure 5:
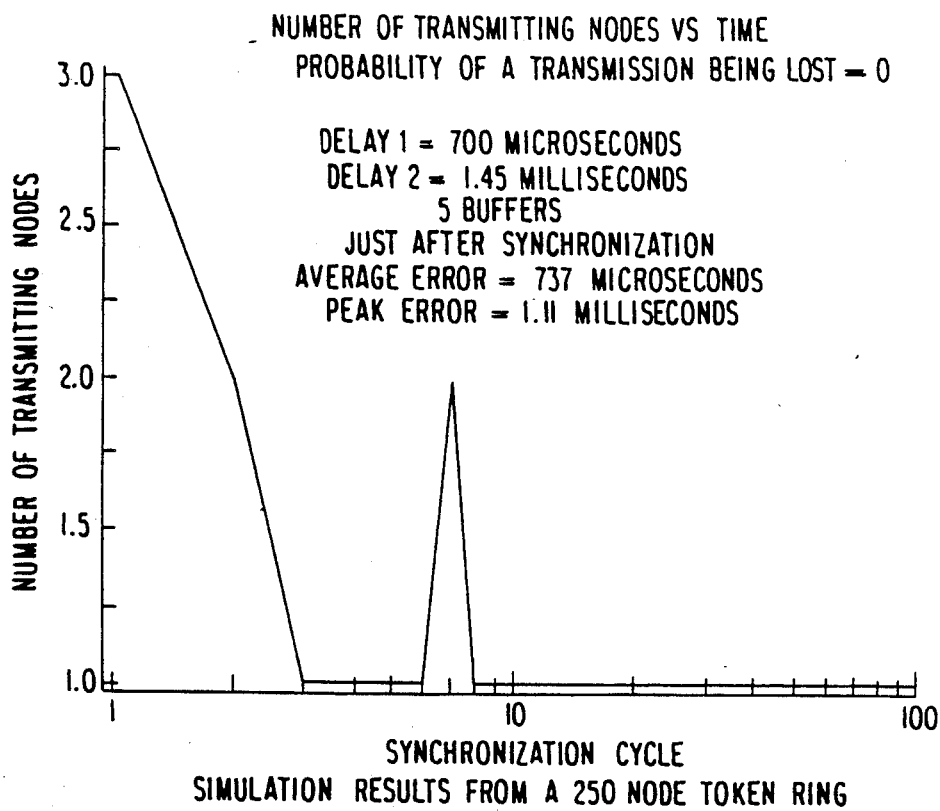
FIG. 5 is a graph showing the results of a simulation of a 250 node token ring network with five buffers and zero probability of a transmission being lost using the implementation of the algorithm.

A token ring running the algorithm was simulated. The results of the simulation are shown in FIGS. 4 to 7. $W_1$ was set to 10 seconds and $W_2$ to 11 seconds. The ith synchronization cycle starts approximately 10i seconds after the network has been brought up. All the messages that are sent in the ith synchronization cycle are added up and plotted against i. Doing so allows us to present the behavior of the algorithm in an easily understood format. Notice that the steady state behavior appears very quickly, typically within three or four synchronization cycles. Also note that the algorithm is extremely robust with respect to message loss and the number of buffers available. FIGS. 4 and 5 show the behavior of the algorithm when no messages are lost. Changing the number of buffers from one to five does not materially affect the running of the algorithm. A steady state in which only one node transmits is reached, and this steady state is achieved very quickly. FIGS. 6 and 7 show the effect of increasing the probability that a message is lost. The performance is still very good, and the maximum number of transmissions hardly ever exceeds five, even when one percent of the messages are lost. The number of buffers is varied too, and the performance is seen to be quite insensitive to this parameter.

While the invention has been described in terms of preferred embodiments depending on the protocol of the network, those skilled in the art will recognize that the invention can be practiced with modification within the spirit and scope of the appended claims.

Having thus described our invention, what we claim as new and desire to secure by Letters Patent is as follows:

1. In an address independent network, a method of synchronizing real time clocks at local nodes of the network comprising the steps of:
   at each node, transmitting to other nodes in the network a local time of the node unless a received time from a remote node is greater than the local time of the node; and
   if the received time is greater than the local time of the node, synchronizing the local time of the node to the received time.

2. The method according to claim 1 further comprising the step of comparing the local time with the received time plus a delay factor determined by characteristics of the network in order to determine if the received time is greater than said local time.

3. The method according to claim 1 further comprising the step of requesting synchronization at a node when that node initially joins the network.

4. In an address independent network, a method of synchronizing real time clocks at local nodes of the network comprising the steps of:
   initializing a timer to a first count $W_1$ and thereafter causing said timer to count down to zero;
   receiving a message from a remote node, said message containing a time T, and forwarding a message with said time T to other remote nodes;
   comparing the time T plus a delay factor determined by the network with a local time C; and
   if the time T plus the delay factor is greater than the local time C, setting C to the maximum of C and the time T plus an averaged delay factor and resetting said timer to a count $W_2$ where $W_2$ is greater than $W_1$.

5. The method according to claim 4 further comprising the steps of:
   if the time T plus the delay factor is not greater than the local time C, when said timer times out, transmitting a message containing the local time C; and resetting said timer to the count $W_1$.

6. The method according to claim 5 wherein said network is a token ring or token bus network, further comprising the steps of:
   deleting any requests for medium access after resetting said timer to the count $W_2$; and
   prior to transmitting a message containing the local time C, requesting access to the medium if the local node does not have permission to transmit.

7. In an address independent network, a system for synchronizing real time clocks at local nodes of the network comprising at each node:
   means for transmitting to other nodes in the network a local time of the node unless a received time from a remote node is greater than the local time of the node; and
   means for synchronizing the local time of the node to the received time if the received time is greater than the local time of the node.

8. In an address independent network, a system for synchronizing clocks at local nodes of the network comprising at each node:
   a down counter connected to a source of clock pulses;
   means for initializing said down counter to a first count $W_1$, said down counter thereafter counting down to zero;
   means for receiving a message from a remote node, said message containing a time T, and forwarding a message with said time T to other remote nodes;
   means for comparing the time T plus a delay factor determined by the network with a local time C; and
   means for setting C to the maximum of C and the time T plus an averaged delay factor and resetting said down counter to a count $W_2$, where $W_2$ is greater than $W_1$, if the time T plus the delay factor is greater than the local time C.

* * * * *